United States Patent

[11] 3,592,014

| [72] | Inventors | Walter Brown<br>Long Beach, Calif.;<br>Donald E. Smith, Houston, Tex. |
|---|---|---|
| [21] | Appl. No. | 855,288 |
| [22] | Filed | Sept. 4, 1969 |
| [45] | Patented | July 13, 1971 |
| [73] | Assignee | North American Rockwell Corporation |

[54] PIPE-CONNECTING SYSTEM FOR THE REMOTE CONNECTION OF PIPE ENDS
11 Claims, 6 Drawing Figs.

[52] U.S. Cl. .................................................. 61/72.1,
61/63, 61/69, 166/.6, 285/18
[51] Int. Cl. ................................................ F16l 1/00,
E02b 3/16, F16l 35/00
[50] Field of Search ............................................ 61/72.3,
72.1, 69, 63; 166/.6; 285/18, 24

[56] References Cited

UNITED STATES PATENTS

| 3,298,092 | 1/1967 | Dozier et al. | 61/72.3 X |
| 3,459,442 | 8/1969 | De Yarmett et al. | 166/.6 |
| 3,482,410 | 12/1969 | Roesky et al. | 61/72.3 |

*Primary Examiner*—Jacob Shapiro
*Attorneys*—L. Lee Humphries, Donald J. Ellingsberg and Charles F. Dischler ABSTRACT: A pipe-connecting system for the remote connection of a pipe, such as a flowline, where the pipe is guided to an exact position at a remote location and connected, for example, to a pipe connector at a submerged sea station.

INVENTORS
WALTER BROWN
DONALD E. SMITH
BY
Donald J. Ellingsberg

INVENTORS
WALTER BROWN
DONALD E. SMITH

BY

Donald J. Ellingsberg

INVENTORS
WALTER BROWN
DONALD E. SMITH
BY
Donald F. Ellingsberg

PIPE-CONNECTING SYSTEM FOR THE REMOTE CONNECTION OF PIPE ENDS

BACKGROUND OF THE INVENTION

The drilling and completion of wells in deep ocean waters to recover extensive oil and gas deposits located under the ocean has been a recent development in the oil and gas industry. These wells need production-completion systems that present problems which are substantially increased as a production field moves into deep water, for example, below 600 feet. Since divers can not safely and readily work in this deep water, production trees and flowlines are usually installed remotely with minimal, if any, diver support.

The remote connection of flowlines to each well includes the problems of guiding a flowline to a precisely established point at the well and completing the required connection of the flowline end to a production tree at the well.

OBJECTS OF THE INVENTION

Accordingly, it is an object of the invention to provide a new and improved pipe-connecting system for the remote connection of pipes.

It is an object of the invention to provide a pipe-connecting system for the remote connection of pipes to a submerged sea station.

It is an object of the invention to provide a pipe-connecting system for the remote connection of flowlines to a submerged well.

It is an object of the invention to provide a pipe-connecting system for the guiding of a flowline to a precisely established point at a submerged well and the remote connection of the flowline to the well.

It is an object of the invention to provide a pipe-connecting system for the self-alignment and remote connection of a flowline to a submerged well.

It is an object of the invention to provide a pipe-connecting system for guiding a pipe end to an exact position opposite a pipe connector at a submerged sea station.

SUMMARY OF THE INVENTION

Briefly, in accordance with the invention, a pipe-connecting system is provided that guides one or more pipe ends to an exact position at a remote location; for example, flowline ends to a submerged sea station that can be in deep water below the reach of divers. The pipe ends are coupled to one or more stinger connectors which are secured to a stinger beam assembly that is supported in the water by one or more floats. The stinger beam assembly has generally wedge-shaped surfaces that match complementary surfaces formed in a stinger cradle at the submerged sea station. The stinger beam assembly is pulled down to the stinger cradle by a pulldown line and guided to the stinger cradle by an outrigger guide sleeve that engages an upwardly traveling portion of the pulldown line. The stinger beam assembly is exactly positioned in both the vertical and horizontal axes coaxially opposite one or more telescoping pipe connectors at the submerged sea station when the complementary mating surfaces are mated.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawing.

DESCRIPTION OF THE INVENTION

Figure 1:
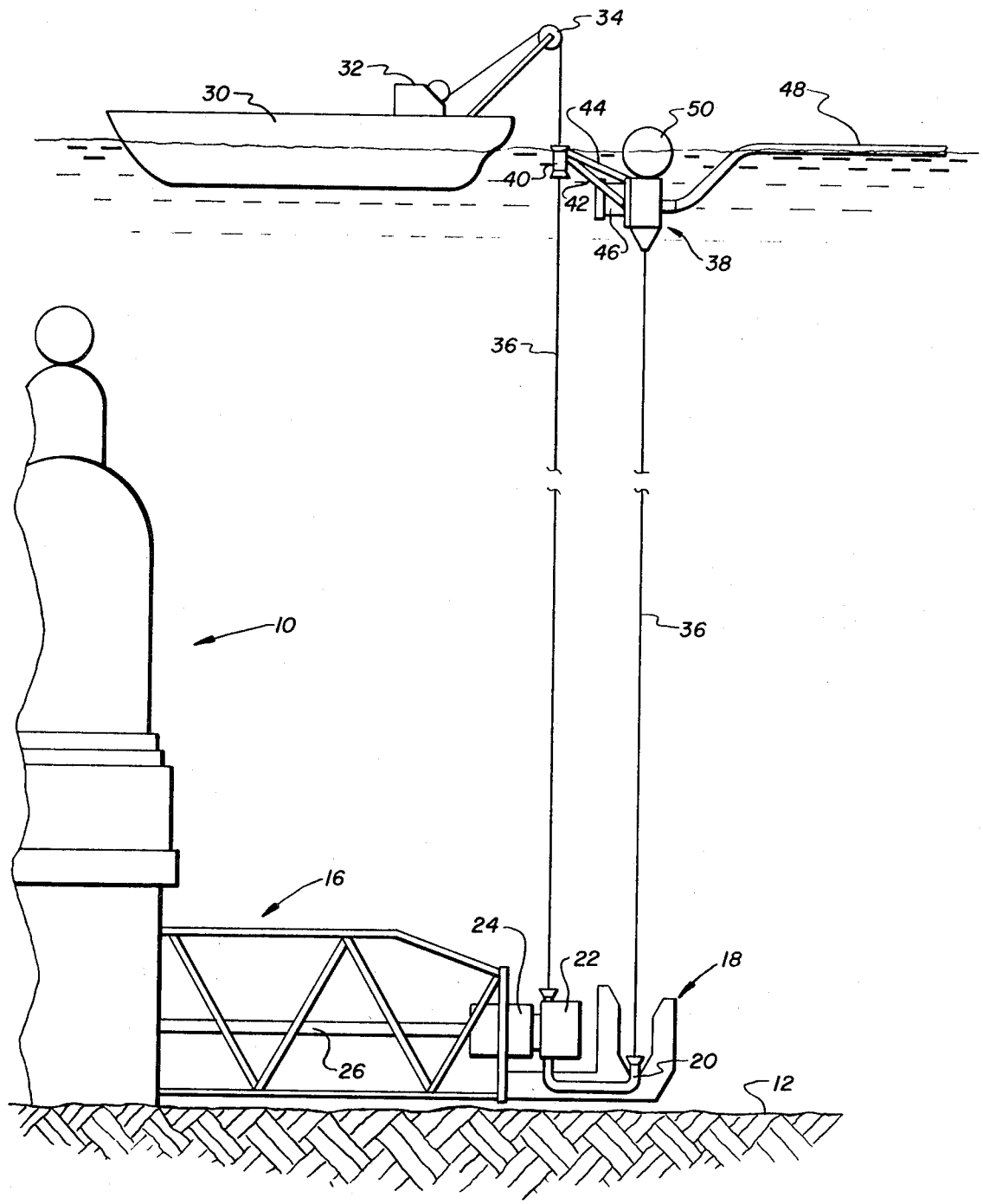
FIG. 1 is a schematic elevation, partly broken away, of the flowline connecting system of the invention.

In FIG. 1 a submerged sea station or satellite 10 provides for the maintenance and control of a plurality of wells and the collection of wells and the collection of production fluids therefrom. The submerged sea station 10 is positioned on the seabed 12. The submerged sea station 10 has a radially extending support structure 16 which provides the support for the pipe-connecting system of the invention.

The pipe-connecting system has a stinger cradle assembly 18 and a drawline or pulldown line guide tube such as J-tube 20 supported by structure 16. A pipe connector 22 with a telescoping pipe portion 24 (such as disclosed in a copending application "Flowline Connector," inventor Walter Brown, one of the coinventors on this case, to be assigned to the same assignee as the present invention, and mailed to the U.S. Pat. Office June 23, 1969) is oriented in a predetermined and precise location relative to the stinger cradle 18. A pipe 26 places the pipe connector 22 and the telescoping pipe portion 24 in fluid communication with the submerged sea station 10.

An upper sea station, such as a lay barge 30, on the sea surface has a conventional constant tension hoist 32 and boom 34 that receive a pulldown line 36. A stinger beam assembly 38 has an outwardly extending guide sleeve 40 connected to and spaced from the stinger beam by braces 42 and 44. The stinger beam assembly 38 has a stinger connector 46 coupled to a pipe 48. The pipe 48 can also be formed from a plurality of pipes that are attached together in a conventional manner to form a pipe bundle. A suitable flotation means, such as float 50, connected to the stinger beam assembly 38 provides positive buoyancy to the stinger beam assembly and thereby maintains pulldown 36 under tension. The pulldown line 36 passes through the J-tube 20 and pulls down the stinger beam assembly 38 to the stinger cradle assembly 18. The tension loading of pulldown line 36 and the cooperating guide sleeve 40, which engages the upwardly travelling portion of pulldown line 36, serve to guide the stinger beam assembly 38 in its descent. The positive mating engagement of the stinger beam assembly 38 with the stinger cradle assembly 18 provides an exact and self-aligning positioning of the stinger connector 46 relative to the pipe connector 22 in both the vertical and horizontal axes as will be described hereinafter.

Figure 3:
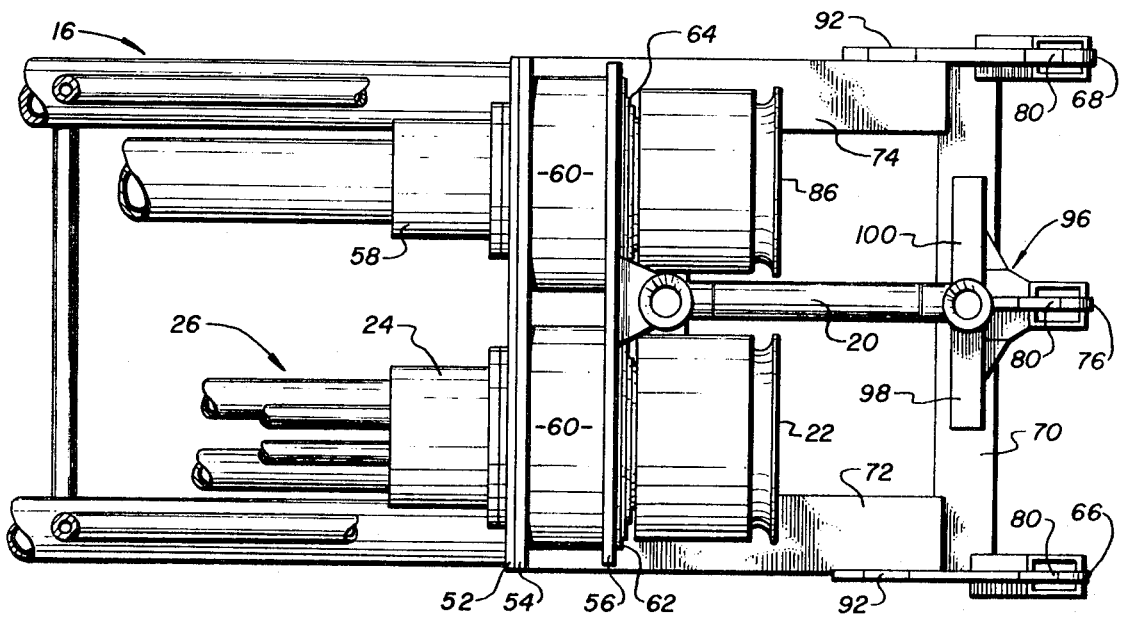
FIG. 3 is a plan view, partly sectional and partly broken away of the submerged portion of FIG. 2.
Figure 2:
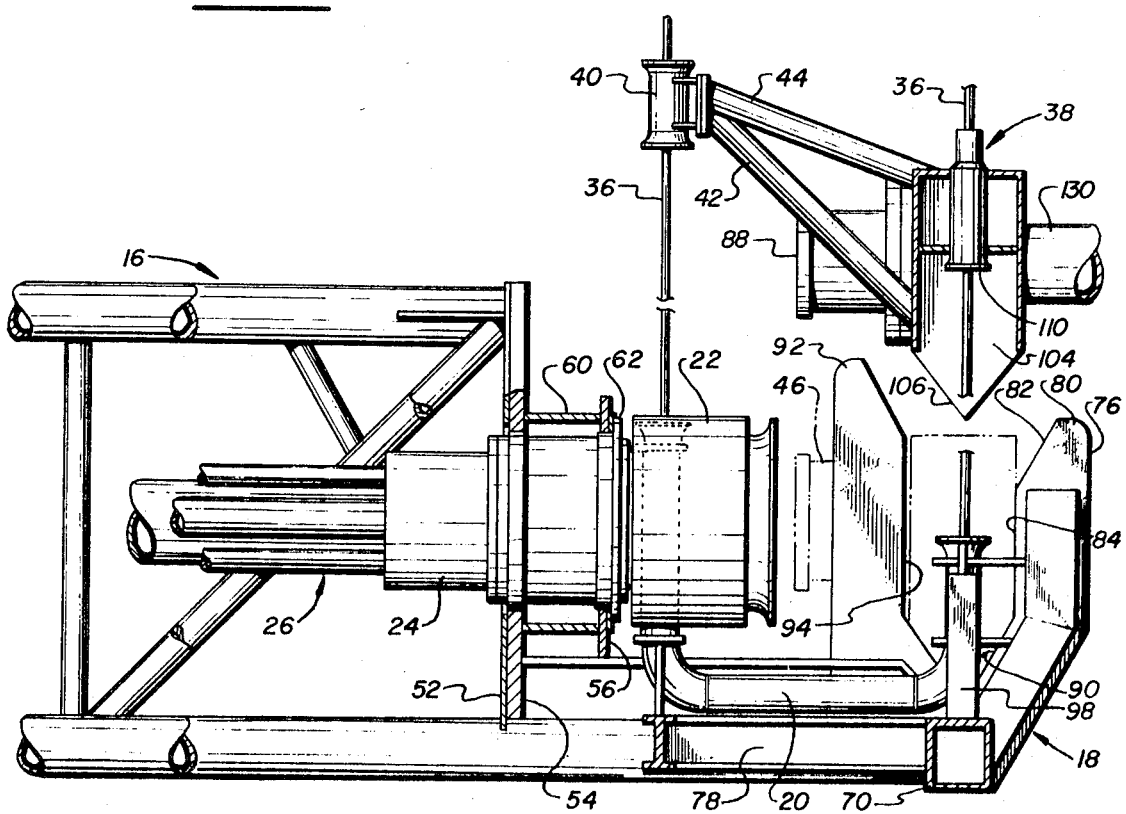
FIG. 2 is an elevation, partly sectional and partly broken away of the submerged portion of the flowline-connecting system of the invention with a stinger beam assembly in near mating engagement.

Referring now to FIGS. 2 and 3, the pipe-connecting system of our invention as briefly described with reference to FIG. 1 will now be described in greater detail where like parts as previously described and shown are identified by the same reference characters.

The support structure 16 of the sea station 10 terminates in a plate member 52 to which a flange plate 54 is suitably connected by welding or the like. Flange plate 54 and a similar parallel plate 56 have suitable apertures for aligning and supporting the outer cylinders of the telescoping pipe connector portion 24 and a similar telescoping pipe connector portion 58. Flange plates 54 and 56 are spaced apart by similar connecting tubes 60. The cylinder portions of the telescoping pipe connectors 24 and 58 are axially secured in relation to the flange plates 54 and 56 by flanges 62 and 64, respectively.

The stinger cradle assembly 18 has generally U-shaped side slot plates 66 and 68 connected to a crossbeam 70 which is supported outwardly from the support structure 16 by T-sections 72 and 74, respectively. A center generally J-shaped slot plate 76 is also secured to the crossbeam 70 and connected to the support structure 16 by a center beam 78.

Similar outer portions 80 of the generally U-shaped side slot plates 66 and 68, and the center generally J-shaped slot plate 76, have an inner cradle profile defined by an upper tapered cutout 82 which serves to guide the stinger beam assembly 38 into the stinger cradle assembly 18; a vertical cutout portion 84 which supports the stinger beam assembly against the horizontal force developed during the engagement of the connector 22 and a similar pipe connector 86 with the stinger connector 46 and a similar stinger connector 88 (see FIG. 4), respectively; and, a lower tapered cutout 90 which supports the stinger beam assembly 38 during the connector engagement in a vertical direction and in the direction of the centerline defined by the connectors. The inner cradle profile of the similar inner portions 92 of the side slot plates 66 and 68 are structurally similar to the inner cradle profile of the outer portion 80 of the slot plates; however, the vertical cutout 94 of the inner portion is relatively longer than the complementary vertical cutout 84 of the outer portion so that the stinger connectors 46 and 88 are prevented from hitting the pipe connectors 22 and 86 when the stinger beam assembly 38 is pulled down by the pulldown line 36 into a mating engagement with the stinger cradle assembly 18.

Since telescoping force is applied to produce the fluidtight engagement between the pipe connectors 22 and 86 and the respective stinger connectors 46 and 88, possible deformation of both the stinger cradle assembly 18 and the stinger beam assembly 38, and alignment mismatch are prevented by the pipe-connecting system of the invention through the coaction of the side slot plates 66 and 68 and the center slot plate 76 in the stinger cradle assembly 18.

The desired orientation of the stinger beam assembly 38 in both the horizontal and vertical axes is further provided by a guide cone assembly 96 in the stinger cradle assembly 18 which is formed from outwardly and downwardly extending alignment surface members 98 and 100. The ends of the guide cone portions 98 and 100 are secured to the crossbeam 70 and to the J-tube 20. Guide cone assembly 96 is adapted to mate with similarly tapered guide plates 102 and 104 (see FIG. 5) connected to and forming a part of the bottom wall 106 of the stinger beam assembly 38.

Figure 6:
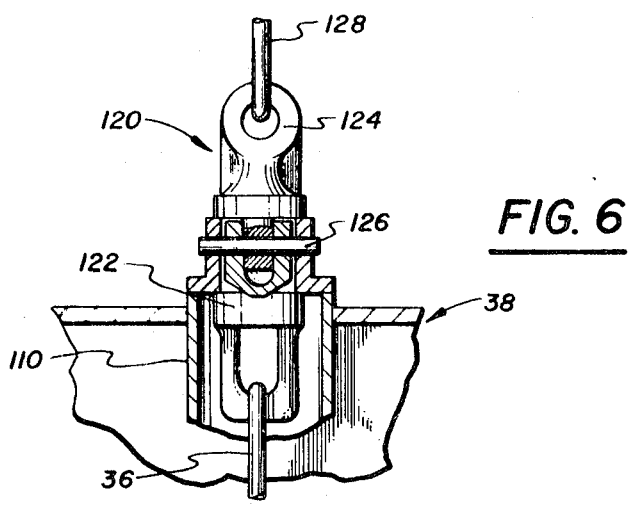
FIG. 6 is an enlarged elevation, partly sectional and partly broken away, of a lock or release portion of the stinger beam assembly of FIG. 5.

A guide tube 110 is centrally positioned in the stinger beam assembly 38 generally at the apex of the guide plates 102 and 104 receives one end of pulldown line 36. The end of the pulldown line 36 passes through the guide tube 110 to a lock assembly 120 as shown by FIG. 6. The pulldown line 36 is secured to a release clevis 122 connected to a flotation clevis 124 by a suitable shearpin 126. A suitable line 128 connects the flotation clevis to the float 50 as shown by FIG. 1.

Figure 4:
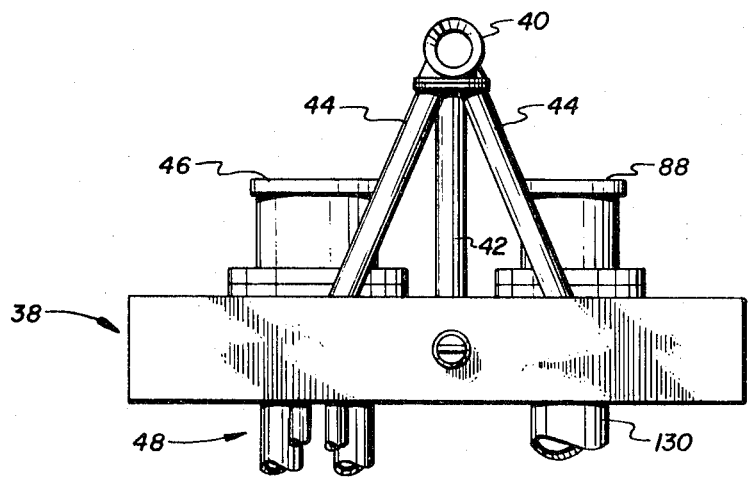
FIG. 4 is a plan view, partly broken away, of the stinger beam assembly of FIG. 2.
Figure 5:
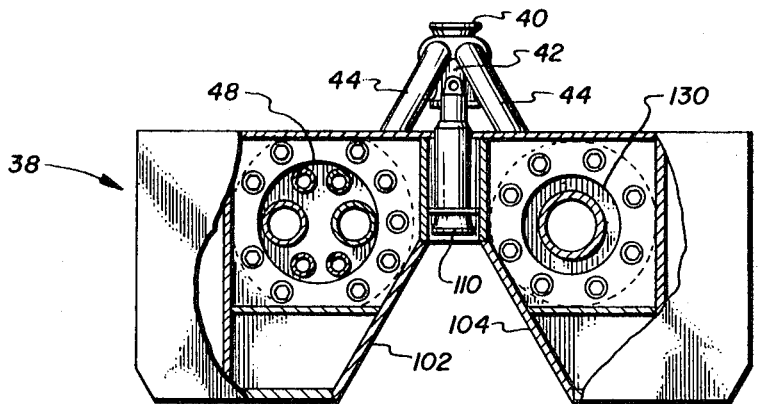
FIG. 5 is an elevation, partly sectional and partly broken away, of the stinger beam assembly of FIG. 2.

Operatively, it may be required to connect one or more pipes, such as flowlines, having various diameters and various configurations; for example, pipe bundles 48 and 130 which have various pipes bundled together as shown by FIGS. 4 and 5. The pipe bundles 48 and 130 are connected to the respective stinger connectors 46 and 88 of the stinger beam assembly 38. The pulldown line 36 is threaded through the guide sleeve 40 of the stinger beam assembly, through the J-tube 20, and then connected to the release clevis 122 of lock assembly 120 while the other end (not shown) is attached to the constant tension hoist 32. Tension is placed on the pulldown line 36 by the constant tension hoist 32 and as the stinger beam assembly 38 is pulled down the guide sleeve 40 slides down over the tensioned pulldown line 36 passing upwardly therethrough. The guide sleeve 40 provides additional stability and guidance to the stinger beam assembly 38 as it is pulled down into a positive and self-aligning mating engagement with the stinger cradle assembly 18. The buoyancy of the pipe bundles 48 and 130 is controlled as the stinger beam assembly 38 and the pipe bundles are pulled down. The buoyancy of the pipe bundles is suitably controlled by conventional methods so that the pipe bundles are allowed to sink at a controlled rate as the stinger beam assembly is pulled down.

After the stinger beam assembly 38 is pulled into mating engagement with the stinger cradle assembly 18 as shown by the phantom lines in FIG. 2, telescoping connectors 24 and 58 are actuated and the respective pipe connectors 22 and 86 extended into fluidtight engagement with the stinger connectors 46 and 88, respectively. A strong pull on the pulldown line 36 then shears the shearpin 126 of the lock assembly 120 as shown by FIG. 6. The pulldown line 36 and release clevis 122 are drawn through the J-tube 20 and the guide sleeve 40 to the lay barge 30, while the flotation clevis 124 is carried to the sea surface by the float 50.

Should it become necessary to repair or replace the stinger connectors, stinger beam assembly, and/or pipe bundles, the reverse procedure can easily be accomplished to release the pipe connectors and permit the stinger beam assembly and pipe bundles to return to the sea surface using conventional flotation or other lift methods.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover the true spirit and scope of the invention.

We claim:

1. A pipe-connecting system comprising:
   a. movable means having at least one pipe end secured thereto and movable therewith,
   b. fixed means spaced from said movable means to receive said movable means,
   c. complementary mating means carried by said movable and fixed means for exact positioning of said movable means in both the vertical and horizontal axes as received by said fixed means,
   d. connector means having at least one pipe and being movably mounted on said fixed means to engage the pipe end secured to said movable means so that said pipes communicate with each other,
   e. drive means acting, through said fixed means, on said movable means to bring said movable means into mating engagement with said fixed means through said complementary mating means, and
   f. actuating means for moving said connector means into engagement with said movable means after said movable means and said fixed means are in mating engagement.

2. The pipe-connecting system of claim 1 in which said movable means is a stinger beam assembly comprising:
   a. support beam means generally defining a longitudinal axis,
   b. stinger means secured to said support beam means and positioned generally normal to the beam means longitudinal axis, said stinger means connected in fluid communication with the pipe end,
   c. at least first and second members connected to said support beam means, said members diverging outwardly from a generally defined stinger beam assembly apex and forming said complementary mating means carried by said movable means, and
   d. release means spaced from said guide means and generally positioned at said apex normal to a plane defined by said stinger means and the beam means longitudinal axis, said release means adapted to engage said drive means acting through said fixed means.

3. The pipe-connecting system of claim 2 in which said fixed means comprises:
   a. cradle means developing a cradle profile adapted to receive said movable means,
   b. at least first and second members connected to said cradle means, said members converging outwardly from said cradle means to a generally defined cradle means apex and forming said complementary mating means carried by said fixed means,
   c. said cradle means and said first and second converging members aligning said movable means in the mating engagement so that said pipe end is accurately positioned in both the horizontal and vertical axes of the system.

4. The pipe-connecting system of claim 3 in which said cradle means includes:
   a. at least first and second generally U-shaped members defining generally parallel and spaced-apart plane surfaces, and
   b. an intermediate generally J-shaped member generally parallel with and between said first and second U-shaped members,
   c. said first and second U-shaped members and said intermediate J-shaped member coacting thereby defining said cradle profile as a cradle opening generally parallel with said support beam means longitudinal axis.

5. The pipe-connecting system of claim 4 in which said movable means includes a first guide means engaging said drive means to guide said movable means into the mating engagement.

6. The pipe-connecting system of claim 5 in which said fixed means includes a second guide means engaging said drive means to coact with said first guide means and guide said movable means into the mating engagement.

7. The pipe-connecting system of claim 6 in which said second guide means is a guide tube positioned in the plane defined by said intermediate J-shaped member and having a first end generally positioned at said cradle means apex.

8. The pipe-connecting system of claim 1 in which said movable means includes a controlled buoyancy means opposing said drive means as said movable means is brought into the mating engagement.

9. A method of remotely connecting a pipe to a submerged sea station from an upper station, the method comprising:
   a. engaging the pipe in a stinger beam having first alignment-camming surfaces,
   b. providing the sea station with an alignment system having second alignment-camming surfaces and a selectively oriented sea station connector that is movable with respect to the sea station to engage the pipe,
   c. extending a drawline from the upper station around said sea station and up through said sea station alignment system,
   d. securing the upward extending end of said drawline to said stinger beam,
   e. applying tension to the other end of said drawline at said upper station to pull the stinger beam and thereby the pipe into said sea station alignment system, thereby causing the first and second alignment surfaces of said stinger beam and said sea station alignment system into both vertical and horizontal alignment so that the pipe is coaxially oriented in spaced relationship with said sea station connector,
   f. moving said sea station connector into mating engagement with the pipe, and
   g. connecting said sea station connector to the pipe.

10. The method of claim 9 which includes guiding the stinger beam from the upper station to said sea station alignment system by slidably engaging the stinger beam with the upwardly traveling drawline.

11. The method of claim 9 which after connecting said sea station connector to the pipe includes releasing said drawline from said stinger beam, and pulling said drawline through said sea station alignment system to the upper station.